US006763223B1

(12) United States Patent
Hirabayashi et al.

(10) Patent No.: US 6,763,223 B1
(45) Date of Patent: Jul. 13, 2004

(54) LOW NOISE CONVERTING APPARATUS

(75) Inventors: Katsuki Hirabayashi, Kanagawa (JP); Masayuki Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/517,793

(22) Filed: Mar. 2, 2000

(30) Foreign Application Priority Data

Mar. 2, 1999 (JP) ........................................ P11-053853
Mar. 3, 1999 (JP) ........................................ P11-055858

(51) Int. Cl.[7] ................................................ H04B 7/14
(52) U.S. Cl. .................... 455/3.02; 455/430; 455/13.3; 342/362
(58) Field of Search .............................. 455/3.02, 3.03, 455/427, 429, 430, 13.3; 342/352, 361, 362, 363, 364, 373, 374, 411; 370/316

(56) References Cited

U.S. PATENT DOCUMENTS 5,303,403 A * 4/1994 Leong ..................... 455/192.3
5,345,591 A 9/1994 Tsurumaki et al. .......... 455/3.2
5,471,664 A * 11/1995 Kim ........................... 455/323
6,198,449 B1 * 3/2001 Muhlhauser et al. ........ 343/753
6,252,551 B1 * 6/2001 Noro et al. .......... 343/700 MS
6,424,817 B1 * 7/2002 Hadden et al. ............ 455/3.02
6,556,807 B1 * 4/2003 Horie et al. ............... 455/3.02
6,600,730 B1 * 7/2003 Davis et al. ................ 370/343

FOREIGN PATENT DOCUMENTS

DE 29616897 11/1996 ............ H03D/7/00
DE 19633147 2/1998 .......... H01Q/19/17

* cited by examiner

*Primary Examiner*—Nick Corsaro
(74) *Attorney, Agent, or Firm*—Jay H. Maioli

(57) ABSTRACT

A reception signal of a horizontally polarized wave and a reception signal of a vertically polarized wave from one satellite are amplified by a first pair of low noise amplifiers, and a reception signal of a horizontally polarized wave and a reception signal of a vertically polarized wave from another satellite are amplified by a second pair of low noise amplifiers. One of the low noise amplifiers is selected in accordance with the polarized wave and the satellite, and the signal from the selected low noise amplifier is supplied to a further low noise amplifier through a coupling circuit. The coupling circuit includes extending portions extended in strip conductor shapes from the first pair of low noise amplifiers and an extending element extended in a strip conductor shape from an input of the next stage low noise amplifier. The extending portions and the extended element are arranged so as to closely face each other.

18 Claims, 8 Drawing Sheets

LOW NOISE CONVERTING APPARATUS

BACKGROUND OF THE INVENTION

1. Field of the Invention

The invention relates to a low noise converting apparatus suitable for use in a case where, for example, radio waves from a plurality of satellites are received by one parabolic antenna.

2. Description of the Related Art

A satellite broadcasting receiving system is provided with a low noise converter (referred to as an LNB) for converting a signal of a band of, for example, 12 GHz received by a parabolic antenna to an intermediate frequency signal of a band of, for example, 1 GHz and transmitting the signal to an indoor IRD (Integrated Receiver Decoder) or a receiver such as television receiver, VTR, or the like having a receiving tuner of a satellite broadcasting through a connecting cable. FIG. 1 shows an example of such a conventional low noise converter.

In FIG. 1, reference numerals 111 and 112 denote current feeding devices. Radio waves are transmitted from a satellite existing on a geostationary satellite orbit by using a band of, for example, 12 GHz by radio waves having an orthogonal relation, for example, by a horizontally polarized wave and a vertically polarized wave. The radio waves from the satellite are received by a parabolic antenna. The reception signals are inputted to the current feeding devices 111 and 112. The reception signals of the horizontally polarized wave and vertically polarized wave are obtained from the current feeding devices 111 and 112, respectively.

The reception signal of the horizontally polarized wave from the current feeding device 111 is supplied to a low noise amplifier 121. The reception signal of the vertically polarized wave from the current feeding device 112 is supplied to a low noise amplifier 122 and amplified.

Control signals are supplied to the low noise amplifiers 121 and 122 from a control unit 110. Although not shown, a switching signal of the horizontally polarized wave and vertically polarized wave is supplied to the control unit 110 from a satellite tuner. A control is performed so that either the low noise amplifier 121 or 122 is made operative in response to the switching signal. Thus, the switching between the horizontally polarized wave and vertically polarized wave is performed.

An output of the low noise amplifier 121 or 122 is supplied to a low noise amplifier 104 through a coupling circuit 103. The reception signal is further amplified by the low noise amplifier 104. An output of the low noise amplifier 104 is supplied to a filter circuit 105. Unnecessary band components in the reception signal are removed by the filter circuit 105. An output of the filter circuit 105 is supplied to a mixer 106.

A local oscillating signal from a local oscillator 107 is supplied to the mixer 106. In the mixer 106, the reception signal of a band of, for example, 12 GHz is converted to an intermediate frequency signal of a band of, for example, 1 GHz. An output of the mixer 106 is extracted from an output terminal 109 through a high frequency amplifier 108. A signal from the output terminal 109 is supplied to the indoor receiver through a connecting cable.

The conventional low noise converter shown in FIG. 1 receives the signal transmitted from one satellite on the geostationary satellite orbit. The radio waves are transmitted from the satellite by two planes of polarization of the horizontally polarized wave and vertically polarized wave. Therefore, the low noise amplifier 121 for the horizontally polarized wave and the low noise amplifier 122 for the vertically polarized wave are provided for the low noise converter. The switching between the horizontally polarized wave and vertically polarized wave is performed by selectively making the low noise amplifier 121 for the horizontally polarized wave and the low noise amplifier 122 for the vertically polarized wave operative.

In recent years, in association with the development of broadcasting services, a number of satellites were launched. Among the satellites, there are satellites launched to close positions on the geostationary satellite orbit. Signals transmitted from the two satellites launched to close positions on the geostationary satellite orbit as mentioned above can be received by one antenna.

FIG. 2 shows a construction of a conventional low noise converter in the case where the signals from the two satellites existing at close positions on the geostationary satellite orbit are received by one antenna.

In FIG. 2, reference numerals 211 and 212 denote current feeding devices for a reception signal from one satellite and 213 and 214 indicate current feeding devices for a reception signal from the other satellite. The radio waves are transmitted from the two satellites existing at close positions on the geostationary satellite orbit by the horizontally polarized wave and vertically polarized wave by using a band of, for example, 12 GHz. The radio waves from the two satellites are received by one parabolic antenna.

Between the two reception outputs, the signal from one satellite is inputted to the current feeding devices 211 and 212 and the reception signals of the horizontally polarized wave and vertically polarized wave of one satellite are derived from the current feeding devices 211 and 212, respectively. The signal from the other satellite is inputted to the current feeding devices 213 and 214 and the reception signals of the horizontally polarized wave and vertically polarized wave of one satellite are derived from the current feeding devices 213 and 214, respectively.

The reception signal of the horizontally polarized wave of one satellite which is supplied from the current feeding device 211 is sent to a low noise amplifier 221 and amplified. The reception signal of the vertically polarized wave of one satellite which is supplied from the current feeding device 212 is sent to a low noise amplifier 222 and amplified. Control signals are supplied from a control unit 230 to the low noise amplifiers 221 and 222. A switching signal of the horizontally polarized wave and vertically polarized wave is supplied to the control unit 230. A control is performed so that either the low noise 20 amplifier 221 or 222 is made operative in response to the switching signal. Thus, the switching between the horizontally polarized wave and vertically polarized wave is performed.

An output of the low noise amplifier 221 or 25 222 is supplied to a low noise amplifier 241 through a coupling circuit 231. The reception signal is further amplified by the low noise amplifier 241. An output of the low noise amplifier 241 is supplied to a coupling circuit 233.

The reception signal of the horizontally polarized wave of the other satellite which is supplied from the current feeding device 213 is sent to a low noise amplifier 223 and amplified. The reception signal of the vertically polarized wave of the other satellite which is supplied from the current feeding device 214 is sent to a low noise amplifier 224 and amplified. Control signals are supplied from the control unit 230 to the low noise amplifiers 223 and 224. The switching signal of the horizontally polarized wave and vertically polarized wave is supplied to the control unit 230. A control is performed so that either the low noise amplifier 223 or 224 is made operative in response to the switching signal. Thus, the switching between the horizontally polarized wave and vertically polarized wave is performed.

An output of the low noise amplifier 223 or 224 is supplied to a low noise amplifier 242 through a coupling circuit 232. The reception signal is further amplified by the low noise amplifier 242. An output of the low noise amplifier 242 is supplied to the coupling circuit 233.

The control signals are supplied from the control unit 230 to the low noise amplifiers 241 and 242. A switching signal of two satellites is supplied to the control unit 230. A control is performed so that either the low noise amplifier 241 or 242 is made operative in response to the switching signal. Thus, the switching between the two satellites is performed.

An output of the coupling circuit 233 is supplied to a filter circuit 225. Unnecessary band components in the reception signal are removed by the filter circuit 225. An output of the filter circuit 225 is supplied to a mixer 206.

A local oscillating signal from a local oscillator 207 is supplied to the mixer 206. In the mixer 206, the reception signal of a band of, for example, 12 GHz is converted to an intermediate frequency signal of a band of, for example, 1 GHz. An output of the mixer 206 is extracted from an output terminal 209 through a high frequency amplifier 208. A signal from the output terminal 209 is supplied to the indoor receiver through a connecting cable.

As mentioned above, the signals from the two satellites existing at close positions on the geostationary satellite orbit can be received by one antenna by providing: the low noise amplifiers 221 and 222 at the first stage for amplifying the reception signal of the horizontally polarized wave and the reception signal of the vertically polarized wave which are transmitted from one satellite; the coupling circuit 231 for switching the reception signal of the horizontally polarized wave and the reception signal of the vertically polarized wave from one satellite; the low noise amplifier 241 at the next stage for amplifying the reception signal of the horizontally polarized wave or the reception signal of the vertically polarized wave from one satellite; the low noise amplifiers 223 and 224 at the first stage for amplifying the reception signal of the horizontally polarized wave and the reception signal of the vertically polarized wave which are transmitted from the other satellite; the coupling circuit 232 for switching the reception signal of the horizontally polarized wave and the reception signal of the vertically polarized wave from the other satellite; the low noise amplifier 242 at the next stage for amplifying the reception signal of the horizontally polarized wave or the reception signal of the vertically polarized wave from the other satellite; and the coupling circuit 233 for switching the reception signals of two satellites.

However, if the signals from two satellites are enabled to be received by one antenna as mentioned above, problems such that the number of amplifiers arranged in the low noise converter increases, the number of coupling circuits increases, the costs rise, and it is difficult to realize a small size and a light weight occur.

That is, in the example shown in FIG. 1, since it is intended to receive the signals from one satellite and the signal of the horizontally polarized wave and the signal of the vertically polarized wave from one satellite are transmitted, the reception signal of the horizontally polarized wave and the reception signal of the vertically polarized wave are amplified by the low noise amplifiers 121 and 122 and the coupling circuit 103 is provided to select the signal of the horizontally polarized wave and the signal of the vertically polarized wave.

However, in case of enabling the signals from two satellites to be received, since the signal of the horizontally polarized wave and the signal of the vertically polarized wave are transmitted from each satellite, the circuits for amplifying and selecting the signal of the horizontally polarized wave and the signal of the vertically polarized wave and the circuit to switch the satellites are necessary.

That is, in case of enabling the signals from two satellites existing at close positions on the geostationary satellite orbit to be received by one antenna, as shown in FIG. 2, there are necessary: the low noise amplifiers 221 and 222 for amplifying the signal of the horizontally polarized wave and the signal of the vertically polarized wave from one satellite; the low noise amplifiers 223 and 224 for amplifying the signal of the horizontally polarized wave and the signal of the vertically polarized wave from the other satellite; the coupling circuit 231 for switching the signal of the horizontally polarized wave and the signal of the vertically polarized wave from one satellite; the coupling circuit 232 for switching the signal of the horizontally polarized wave and the signal of the vertically polarized wave from the other satellite; the low noise amplifiers 241 and 242 for further amplifying the signals from the satellites; and the coupling circuit 232 for switching the signals of two satellites.

Particularly, providing the three coupling circuits 231, 232, and 233 causes an increase in size when they are mounted.

That is, those coupling circuits are constructed on a microstrip line as shown in FIG. 3. As shown in FIG. 3, the coupling circuit 231 is constructed by extending portions 151, 152, and 153 of strip conductors each having a length of almost λ/4 (λ denotes a wavelength at a center frequency of a reception band). The extending portion 151 is extended from an output of the low noise amplifier 221 and the extending portion 152 is extended from an output of the low noise amplifier 222. The extending portion 153 is extended from an input of the low noise amplifier 241. The extending portions 151 and 152 are arranged so as to face the extending portion 153 with predetermined intervals.

As mentioned above, by arranging the extending portion 153 extended from the input of the low noise amplifier 241 so as to face the extending portions 151 and 152 extended from the outputs of the low noise amplifiers 221 and 222, the outputs of the low noise amplifiers 221 and 222 and the input of the low noise amplifier 241 are electrically coupled.

Similarly, as shown in FIG. 3, the coupling circuit 232 is constructed by extending portions 161, 162, and 163 of strip conductors each having a length of almost λ/4. The extending portion 161 is extended from an output of the low noise amplifier 223 and the extending portion 162 is extended from an output of the low noise amplifier 224. The extending portion 163 is extended from an input of the low noise amplifier 242. The extending portions 161 and 162 are arranged so as to face the extending portion 163 with predetermined intervals.

As mentioned above, by arranging the extending portion 163 extended from the input of the low noise amplifier 242 so as to face the extending portions 161 and 162 extended from the outputs of the low noise amplifiers 223 and 224, the outputs of the low noise amplifiers 223 and 224 and the input of the low noise amplifier 242 are electrically coupled.

Similarly, as shown in FIG. 3, the coupling circuit 233 is constructed by extending portions 171, 172, and 173 of strip conductors each having a length of almost λ/4. The extending portion 171 is extended from an output of the low noise amplifier 241 and the extending portion 172 is extended from an output of the low noise amplifier 242. The extending portion 173 is extended from an input of the filter circuit 225 (refer to FIG. 2). The extending portions 171 and 172 are arranged so as to face the extending portion 173 with predetermined intervals.

As mentioned above, by arranging the extending portion 173 extended from the input of the filter circuit 225 so as to face the extending portions 171 and 172 extended from the outputs of the low noise amplifiers 241 and 242, the outputs of the low noise amplifiers 241 and 242 and the input of the filter circuit 225 are electrically coupled.

As mentioned above, the coupling circuit comprises the extending portions of the strip conductors each having a length of almost λ/4 and the position to arrange the coupling circuit is restricted by a circuit construction. Therefore, when the number of coupling circuits increases, an area on a circuit board to construct the coupling circuits increases, a degree of freedom in a layout of circuit parts is small, and a circuit scale is enlarged.

OBJECTS AND SUMMARY OF THE INVENTION

It is, therefore, an object of the invention to provide a low noise converting apparatus which can receive radio waves from a plurality of satellites by one antenna and realize a miniaturization and a reduction in costs.

According to one aspect of the invention, there is provided a low noise converting apparatus comprising: a plurality of first-stage low noise amplifying means each provided in a path of a reception signal of a polarized wave of each of a plurality of satellites; control means for selectively making one of the plurality of first-stage low noise amplifying means operative in accordance with the satellite to be selected and the polarized wave of a radio wave; one next-stage low noise amplifying means for further amplifying an output of the first-stage low noise amplifying means; coupling means for coupling the plurality of first-stage low noise amplifying means and the one next-stage low noise amplifying means; and frequency converting means for frequency converting an output of the next-stage low noise amplifying means.

The reception signal of the horizontally polarized wave and the reception signal of the vertically polarized wave of one satellite are amplified by the first-stage low noise amplifiers, respectively. The reception signal of the horizontally polarized wave and the reception signal of the vertically polarized wave of the other satellite are amplified by the first-stage low noise amplifiers, respectively. Outputs of the first-stage low noise amplifiers are selected, coupled by the coupling circuit, and supplied to the next-stage low noise amplifier. With this construction, a plurality of coupling circuits needed in the conventional low noise converter are constructed by one coupling circuit and miniaturized and the costs are reduced. The next-stage low noise amplifier is used in common by one low noise amplifier, the number of parts is reduced, and a construction, connecting lines, and the like are simplified.

According to another aspect of the invention, there is further provided a low noise converting apparatus comprising: coupling means for synthesizing radio waves of different frequencies among radio waves of a plurality of satellites and outputting a synthesized radio wave; first-stage low noise amplifying means for amplifying a reception signal of the plurality of satellites synthesized by the coupling means; next-stage low noise amplifying means for further amplifying an output of the first-stage low noise amplifying means; and frequency converting means for frequency converting an output of the next-stage low noise amplifying means.

For example, in case of receiving signals from two satellites, the reception signals of different frequencies are synthesized and sent to the first-stage low noise amplifier. Thus, the first-stage low noise amplifier is used in common for the reception signals from two satellites and the miniaturization and reduction of costs are accomplished.

The above and other objects and features of the present invention will become apparent from the following detailed description and the appended claims with reference to the accompanying drawings.

DETAILED DESCRIPTION OF THE PREFERRED EMBODIMENTS

Figure 4:
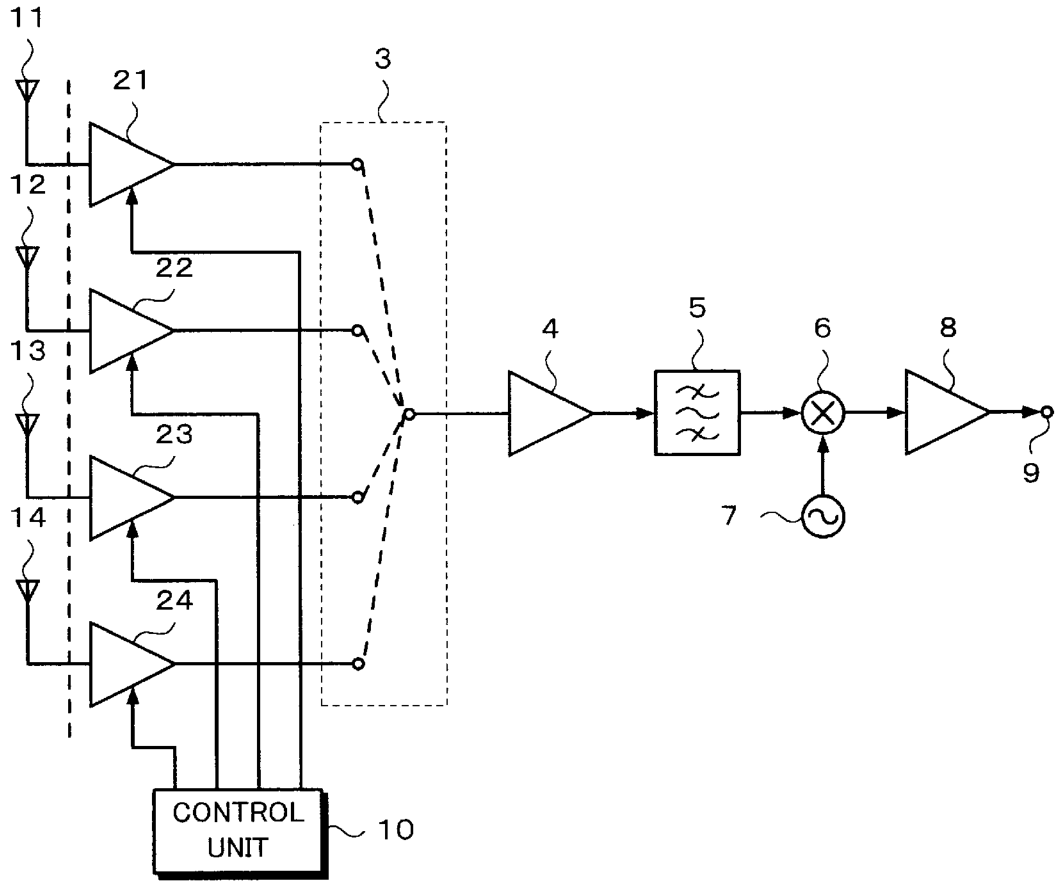
FIG. 4 is a block diagram showing a construction of the first embodiment of the invention.

Three embodiments of the invention will now be described hereinbelow with reference to the drawings. First, the first embodiment among them will be described. FIG. 4 shows a construction of the first embodiment.

In FIG. 4, reference numerals 11 and 12 denote current feeding devices for a reception signal from one satellite and 13 and 14 indicate current feeding devices for a reception signal from the other satellite. The radio waves are transmitted from the two satellites existing at close positions on the geostationary satellite orbit by the horizontally polarized wave and vertically polarized wave by using a band of, for example, 12 GHz. The radio waves from the two satellites are received by one parabolic antenna.

Between the reception outputs, the signal from one satellite is inputted to the current feeding devices 11 and 12 and the reception signals of the horizontally polarized wave and vertically polarized wave of one satellite are derived from the current feeding devices 11 and 12, respectively. The signal from the other satellite is inputted to the current feeding devices 13 and 14 and the reception signals of the horizontally polarized wave and vertically polarized wave of the other satellite are derived from the current feeding devices 13 and 14, respectively.

The reception signal of the horizontally polarized wave of one satellite which is supplied from the current feeding device 11 is sent to a low noise amplifier 21 and amplified. The reception signal of the vertically polarized wave of one satellite which is supplied from the current feeding device 12 is sent to a low noise amplifier 22 and amplified. The reception signal of the horizontally polarized wave of the other satellite which is supplied from the current feeding device 13 is sent to a low noise amplifier 23 and amplified. The reception signal of the vertically polarized wave of the other satellite which is supplied from the current feeding device 14 is sent to a low noise amplifier 24 and amplified.

Control signals are supplied from a control unit 10 to the low noise amplifiers 21 to 24. A switching signal of the horizontally polarized wave and vertically polarized wave and a switching signal of the satellites are supplied to the control unit 10. A control is performed so that one of the low noise amplifiers 21 to 24 is made operative in response to the switching signals. Thus, the switching between the horizontally polarized wave and vertically polarized wave and the switching between the satellites are simultaneously performed.

Outputs of the low noise amplifiers 21 to 24 are supplied to a low noise amplifier 4 through a coupling circuit 3. The reception signal is further amplified by the low noise amplifier 4. An output of the low noise amplifier 4 is supplied to a filter circuit 5. Unnecessary band components in the reception signal are removed by the filter circuit 5. An output of the filter circuit 5 is supplied to a mixer 6.

A local oscillating signal from a local oscillator 7 is supplied to the mixer 6. In the mixer 6, the reception signal of a band of, for example, 12 GHz is converted to an intermediate frequency signal of a band of, for example, 1 GHz. An output of the mixer 6 is extracted from an output terminal 9 through a high frequency amplifier 8. A signal from the output terminal 9 is supplied to the indoor receiver through a connecting cable.

Figure 1:
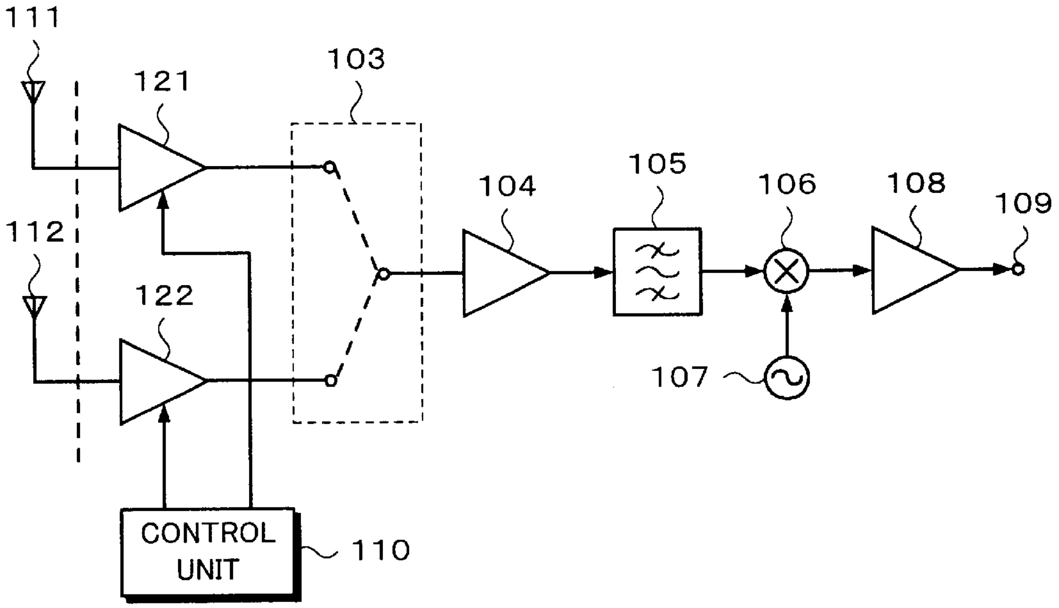
FIG. 1 is a block diagram for use in explanation of a conventional low noise converter.
Figure 2:
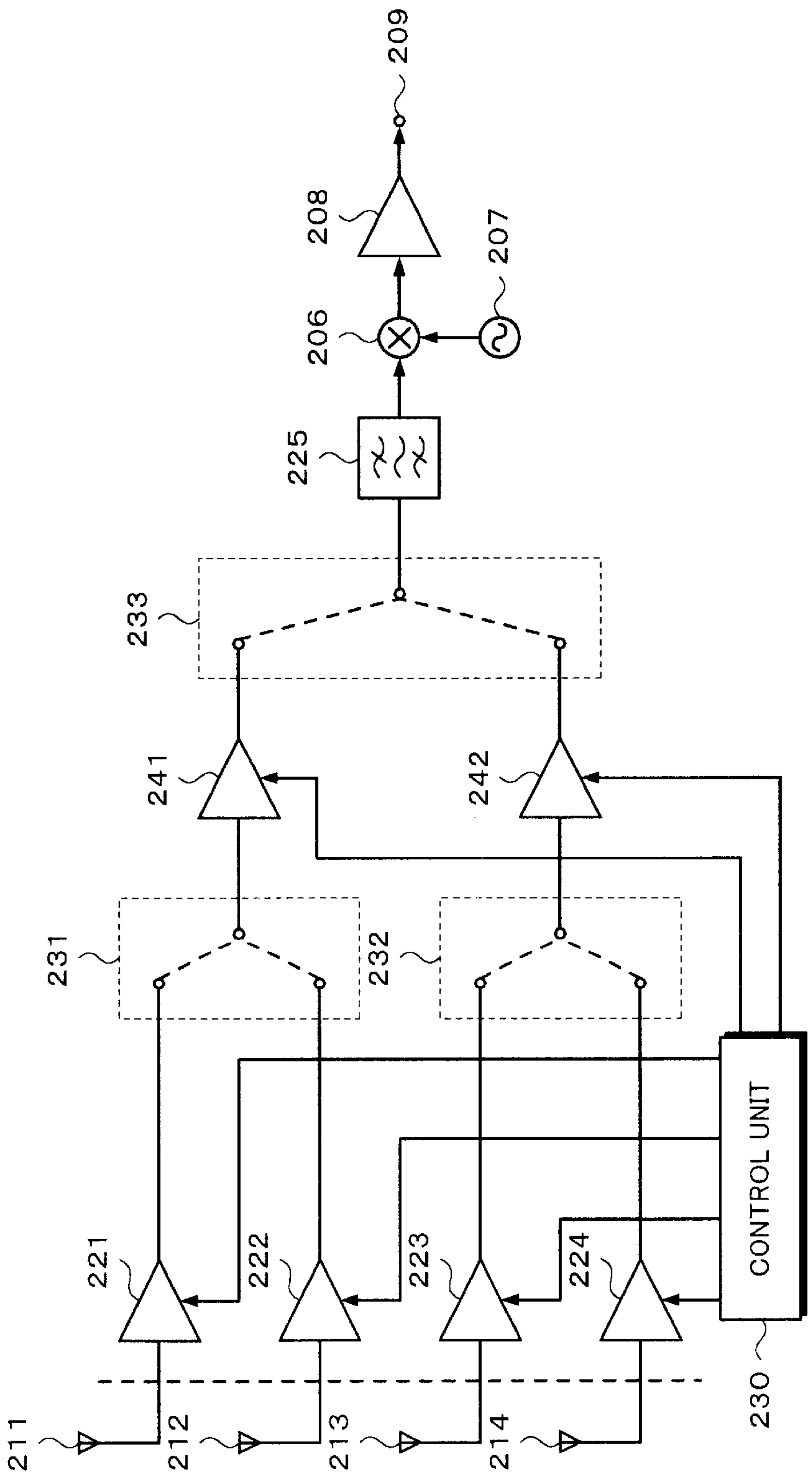
FIG. 2 is a block diagram for use in explanation of a conventional low noise converter.
Figure 3:
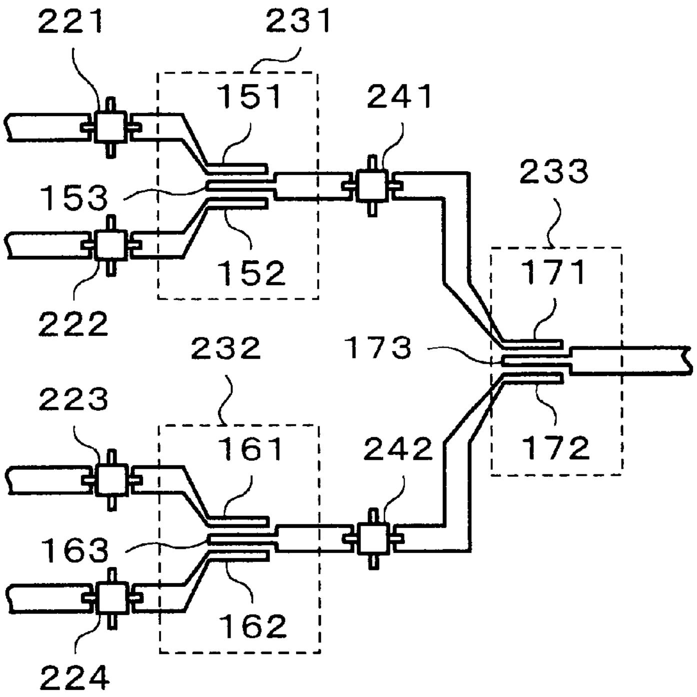
FIG. 3 is a schematic diagram showing a layout on a circuit board of a main portion of the conventional low noise converter.

According to the first embodiment constructed as mentioned above, the three coupling circuits 231, 232, and 233 (refer to FIG. 2) needed in the conventional low noise converter are constructed by one coupling circuit 3 and miniaturized and the costs are reduced. Since the low noise amplifiers 241 and 242 at the second stage are used in common by one low noise amplifier 4, the parts corresponding to one low noise amplifier are reduced and the construction, the connecting lines, and the like of the control unit 10 for the low noise amplifiers 21, 22, 23, and 24 are simplified.

Figure 5:
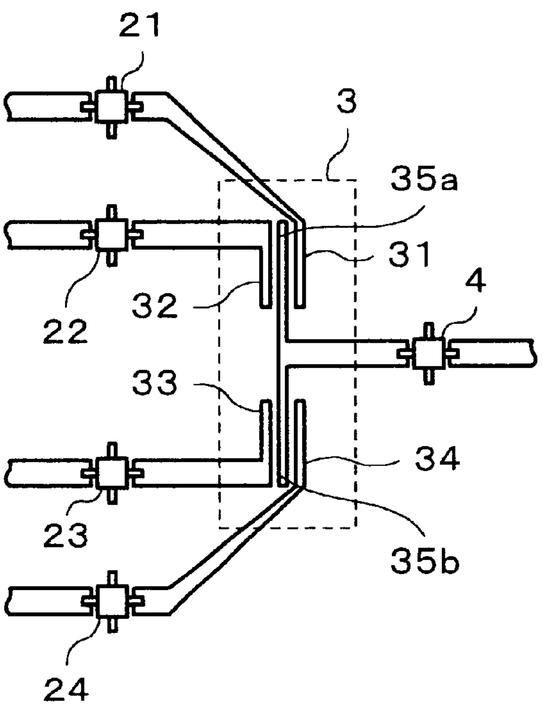
FIG. 5 is a schematic diagram showing a layout on a circuit board of a main portion of the first embodiment of the invention.

That is, FIG. 5 shows an example of a specific layout on a circuit board of the low noise amplifiers 21, 22, 23, 24, and 4 and the coupling circuit 3 according to the embodiment.

A dielectric material such as Teflon (registered trade mark), ceramics, or the like is used as a material of the circuit board and strip conductors are formed on the circuit board. For example, a copper foil material is used as a strip conductor. Therefore, a distribution constant line path of the microstrip lines, strip lines, or the like is constructed.

For example, an FET (Field Effect Transistor), an HEMT (High Electron Mobility Transistor), or the like is used as each of the low noise amplifiers 21, 22, 23, 24, and 4. The signals from the current feeding devices 11 and 12 are amplified by the low noise amplifiers 21 and 22 and sent to the coupling circuit 3. The signals from the current feeding devices 13 and 14 are amplified by the low noise amplifiers 23 and 24 and sent to the coupling circuit 3.

As shown in FIG. 5, the coupling circuit 3 is constructed by extending portions 31, 32, 33, 34, 35*a*, and 35*b* of strip conductors each having a length of almost λ/4. The extending portion 31 is extended from an output of the low noise amplifier 21 and the extending portion 32 is extended from an output of the low noise amplifier 22. The extending portion 33 is extended from an output of the low noise amplifier 23. The extending portion 34 is extended from an output of the low noise amplifier 24. The extending portions 35*a* and 35*b* are extended from an input of the low noise amplifier 4. The extending portions 31 and 32 are arranged so as to face the extending portion 35*a* with predetermined intervals. The extending portions 33 and 34 are arranged so as to face the extending portion 35*b* with predetermined intervals.

As mentioned above, by arranging the extending portion 35*a* extended from the input of the low noise amplifier 4 so as to face the extending portions 31 and 32 extended from the outputs of the low noise amplifiers 21 and 22, the outputs of the low noise amplifiers 21 and 22 and the input of the low noise amplifier 4 are electrically coupled. By arranging the extending portion 35*b* extended from the input of the low noise amplifier 4 so as to face the extending portions 33 and 34 extended from the outputs of the low noise amplifiers 23 and 24, the outputs of the low noise amplifiers 23 and 24 and the input of the low noise amplifier 4 are electrically coupled.

When the mounting parts such as low noise amplifiers 21, 22, 23, 24, and 4 and the like are installed, for example, a cream solder is filled into each part pad on the strip conductors, thereby installing the mounting parts. By heating the cream solder by heating means such as a reflow furnace or the like in this state, the soldering is performed.

The first embodiment has been described above with respect to the case of receiving the radio waves from two satellites of a band of, for example, 12 GHz transmitted from two satellites on the geostationary satellite orbit. The invention, however, can be also similarly applied to the case of receiving radio waves from three or more satellites.

In the foregoing first embodiment, although each satellite transmits the radio wave of the horizontally polarized wave and the radio wave of the vertically polarized wave, the invention can be also similarly applied to the case of transmitting a radio wave of a circularly polarized wave of the right turn and a radio wave of a circularly polarized wave of the left turn from each satellite.

That is, in the above example, although both two satellites transmit the radio wave of the horizontally polarized wave and the radio wave of the vertically polarized wave, the invention can be also applied to the case where one satellite transmits a radio wave of a horizontally polarized wave and a radio wave of a vertically polarized wave and the other satellite transmits a radio wave of a circularly polarized wave of the right turn and a radio wave of a circularly polarized wave of the left turn. The invention can also cope with the case where both satellites transmit a radio wave of a circularly polarized wave of the right turn and a radio wave of a circularly polarized wave of the left turn. Further, the invention can also cope with the case where one satellite transmits a radio wave of a horizontally polarized wave and a radio wave of a vertically polarized wave and the other satellite transmits a radio wave of a circularly polarized wave of the right turn and a radio wave of a circularly polarized wave of the left turn.

The invention can also cope with the case where one satellite transmits a radio wave of one polarized wave and the other satellite transmits radio waves of two polarized waves. For example, the invention can also cope with the case of receiving radio wave from a satellite which broadcasts only a radio wave of a circularly polarized wave of the right or left turn and radio waves from a satellite which transmits a radio wave of a horizontally polarized wave and a radio wave of a vertically polarized wave. The invention can also cope with the case of receiving a radio wave from a satellite which broadcasts only a radio wave of a circularly polarized wave of the right or left turn and radio waves from a satellite which transmits a radio wave of a circularly polarized wave of the right turn and a radio wave of a circularly polarized wave of the left turn. The invention can also cope with the case of receiving a radio wave from a satellite which broadcasts only a radio wave of a horizontally or vertically polarized wave and radio waves from a satellite which transmits a radio wave of a horizontally polarized wave and a radio wave of a vertically polarized wave. The invention can also cope with the case of receiving a radio wave from a satellite which broadcasts only a radio wave of a horizontally or vertically polarized wave and radio waves from a satellite which transmits a radio wave of a circularly polarized wave of the right turn and a radio wave of a circularly polarized wave of the left turn.

Each of the low noise amplifiers 21, 22, 23, 24, and 4 and the high frequency amplifier 8 does not need to be always constructed by one active device but they can be realized as an integrated circuit. Further, the mixer 6, local oscillator 7, and amplifier 8 can be constructed as an integrated circuit and used. It is also possible to use a construction in which the high frequency amplifier 8 is omitted.

Although the first embodiment has been described with respect to the case where the strip conductor of a copper foil material is formed on the circuit board, the invention can be also easily applied to, for example, a circuit board on which a pattern is formed by a thick film print, a circuit board on which a pattern is formed by electroless plating, or the like. Further, although the embodiment has been described with respect to the case of using the parts enclosed in a package for surface mounting, the devices can be formed on one chip or chip-shaped devices can be integrated by using the die bonding or wire bonding technique.

Figure 6:
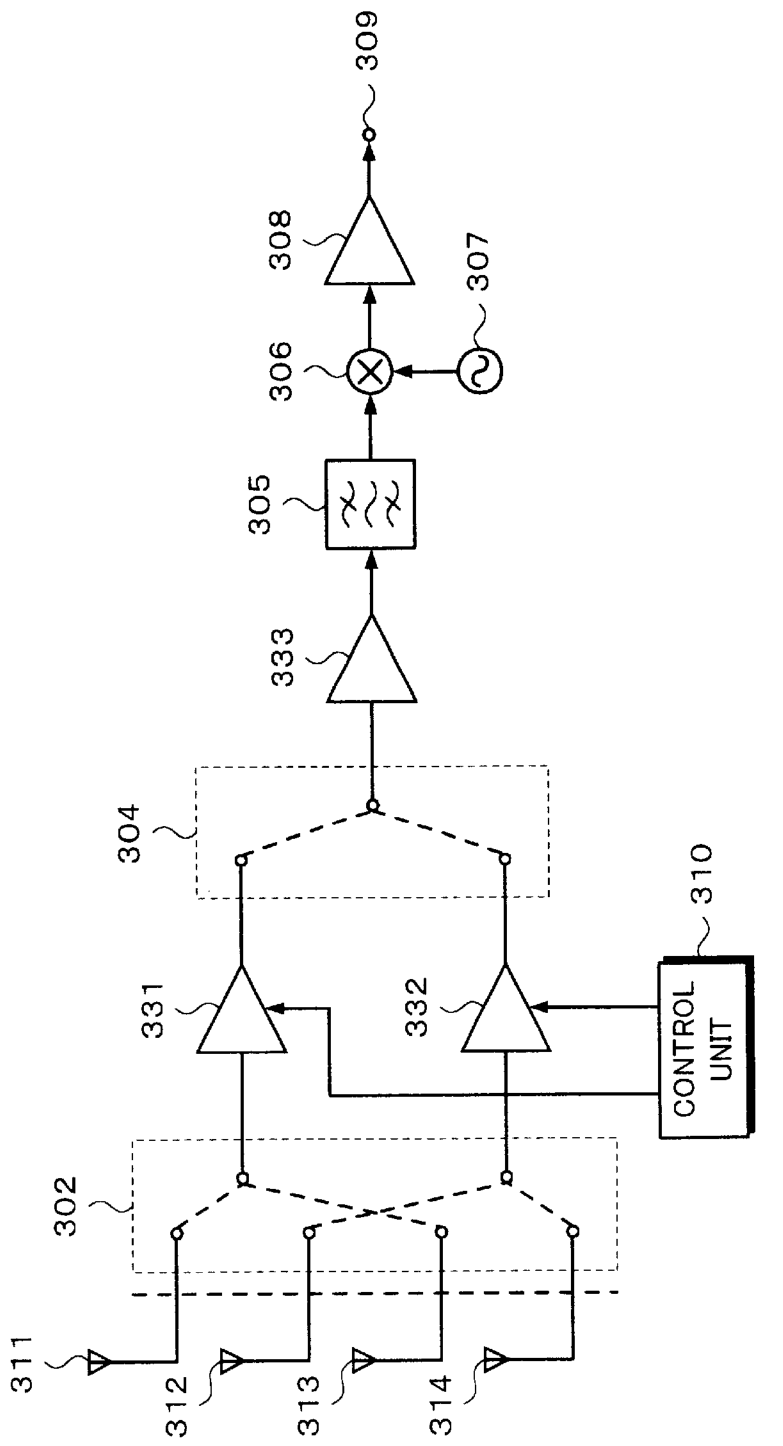
FIG. 6 is a block diagram showing a construction of the second embodiment of the invention.

The second embodiment of the invention will now be described with reference to the drawings. FIG. 6 shows a construction of the second embodiment.

In FIG. 6, reference numerals 311 and 312 denote current feeding devices for a reception signal from one satellite and 313 and 314 indicate current feeding devices for a reception signal from the other satellite. The radio waves are transmitted from the two satellites existing at close positions on the geostationary satellite orbit by the horizontally polarized wave and vertically polarized wave by using a band of, for example, 12 GHz. The radio waves from the two satellites are received by one parabolic antenna.

Between the two reception outputs, the signal from one satellite is inputted to the current feeding devices 311 and 312 and the reception signals of the horizontally polarized wave and vertically polarized wave of one satellite are derived from the current feeding devices 311 and 312, respectively. The signal from the other satellite is inputted to the current feeding devices 313 and 314 and the reception signals of the horizontally polarized wave and vertically polarized wave of the other satellite are derived from the current feeding devices 313 and 314, respectively.

The reception signal of the horizontally polarized wave of one satellite which is supplied from the current feeding device 311 and the reception signal of the horizontally polarized wave of the other satellite which is supplied from the current feeding device 313 are sent to a low noise amplifier 331 through a coupling circuit 302. The reception signal of the vertically polarized wave of one satellite which is supplied from the current feeding device 312 and the reception signal of the vertically polarized wave of the other satellite which is supplied from the current feeding device 314 are sent to a low noise amplifier 332 through the coupling circuit 302.

Control signals are supplied from a control unit 310 to the low noise amplifiers 331 and 332. A switching signal of the horizontally polarized wave and vertically polarized wave is supplied to the control unit 310. A control is performed so that either the low noise amplifier 331 or 332 is made operative in response to the switching signal. Thus, the switching between the horizontally polarized wave and vertically polarized wave is performed.

Outputs of the low noise amplifiers 331 and 332 are supplied to a low noise amplifier 333 through a coupling circuit 304. The reception signal is further amplified by the low noise amplifier 333. An output of the low noise amplifier 333 is supplied to a filter circuit 305. Unnecessary band components in the reception signal are removed by the filter circuit 305. An output of the filter circuit 305 is supplied to a mixer 306.

A local oscillating signal from a local 25 oscillator 307 is supplied to the mixer 306. In the mixer 306, the reception signal of a band of, for example, 12 GHz is converted to an intermediate frequency signal of a band of, for example, 1 GHz. An output of the mixer 306 is extracted from an output terminal 309 through a high frequency amplifier 308. A signal from the output terminal 309 is supplied to the indoor receiver through a connecting cable.

According to the embodiment of the invention, the signals of two systems comprising the reception signal of the horizontally polarized wave of one satellite from the current feeding device 311 and the reception signal of the horizontally polarized wave of the other satellite from the current feeding device 313 are supplied to the low noise amplifier 331, and the reception signal of the horizontally polarized wave of one satellite and the reception signal of the horizontally polarized wave of the other satellite are amplified by the low noise amplifier 331. As mentioned above, the amplifier at the first stage for the reception signal of the horizontally polarized wave of one satellite and the amplifier at the first stage for the reception signal of the horizontally polarized wave of the other satellite are used in common by the low noise amplifier 331. If a frequency of the signal from one satellite and a frequency of the signal from the other satellite differ, the signals of two systems can be selected on the receiver side later. Therefore, the amplifier at the first stage for the reception signal of the horizontally polarized wave of one satellite and the amplifier at the first stage for the reception signal of the horizontally polarized wave of the other satellite are used in common by the low noise amplifier 331.

Similarly, the signals of two systems comprising the reception signal of the vertically polarized wave of one satellite from the current feeding device 312 and the reception signal of the vertically polarized wave of the other satellite from the current feeding device 314 are supplied to the low noise amplifier 332, and the reception signal of the vertically polarized wave of one satellite and the reception signal of the vertically polarized wave of the other satellite are amplified by the low noise amplifier 332. As mentioned above, the amplifier at the first stage for the reception signal of the vertically polarized wave of one satellite and the amplifier at the first stage for the reception signal of the vertically polarized wave of the other satellite are used in common by the low noise amplifier 332. If a frequency of the signal from one satellite and a frequency of the signal from the other satellite differ, the signals of two systems can be selected on the receiver side later. Therefore, the amplifier at the first stage for the reception signal of the vertically polarized wave of one satellite and the amplifier at the first stage for the reception signal of the vertically polarized wave of the other satellite are used in common by the low noise amplifier 332.

Figure 7:
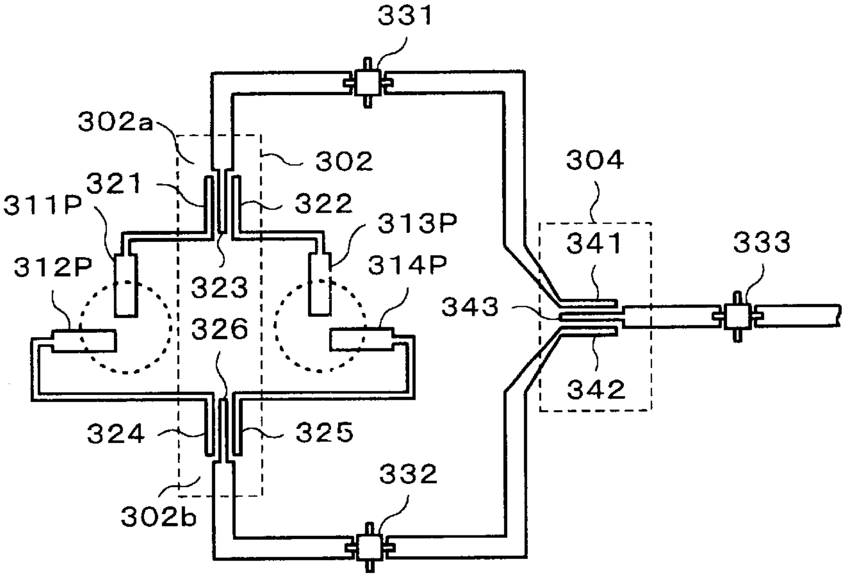
FIG. 7 is a schematic diagram showing a layout on a circuit board of a main portion of the second embodiment of the invention.

FIG. 7 shows an example of a specific layout on a circuit board of the coupling circuit 302 and the low noise amplifiers 331, 332, and 333 provided as an input section of the foregoing second embodiment.

A dielectric material such as Teflon (registered trade mark), ceramics, or the like is used as a material of the circuit board and strip conductors are formed on the circuit board as shown in FIG. 7. For example, a copper foil material is used as a strip conductor.

In FIG. 7, reference numerals 311P and 312P denote probes for receiving the signals of the horizontally polarized wave and vertically polarized wave of one satellite. The probes correspond to the current feeding devices 311 and 312, respectively. Reference numerals 313P and 314P denote probes for receiving the signals of the horizontally polarized wave and vertically polarized wave of the other satellite. The probes correspond to the current feeding devices 313 and 314, respectively. An HEMT (High Electron Mobility Transistor) or an FET (Field Effect Transistor) is used as each of the low noise amplifiers 331, 332, and 333.

As shown in FIG. 7, the coupling circuit 302 is constructed by: a coupling portion 302*a* comprising extending portions 321, 322, and 323 of strip conductors each having a length of almost λ/4; and a coupling portion 302*b* comprising extending portions 324, 325, and 326 of strip conductors each having a length of almost λ/4.

In the coupling portion 302*a*, the extending portion 321 is extended from the probe 311P to receive the signal of the horizontally polarized wave of one satellite and the extending portion 322 is extended from the probe 313P to receive the signal of the horizontally polarized wave of the other satellite. The extending portion 323 is extended from an input of the low noise amplifier 331. As mentioned above, by arranging the extending portion 323 extended from the input of the low noise amplifier 331 so as to face the extending portion 321 extended from the probe 311P and the extending portion 322 extended from the probe 313P with predetermined intervals, the outputs of the probes 311P and 313P and the input of the low noise amplifier 331 are electrically coupled.

In the coupling portion 302*b*, the extending portion 324 is extended from the probe 312P to receive the signal of the vertically polarized wave of one satellite and the extending portion 325 is extended from the probe 314P to receive the signal of the vertically polarized wave of the other satellite. The extending portion 326 is extended from an input of the low noise amplifier 332. As mentioned above, by arranging the extending portion 326 extended from the input of the low noise amplifier 332 so as to face the extending portion 324 extended from the probe 312P and the extending portion 325 extended from the probe 314P with predetermined intervals, the outputs of the probes 312P and 314P and the input of the low noise amplifier 332 are electrically coupled.

The coupling circuit 304 is constructed by extending portions 341, 342, and 343 of strip conductors each having a length of almost λ/4. The extending portion 341 is extended from an output of the low noise amplifier 331. The extending portion 342 is extended from an output of the low noise amplifier 332. The extending portion 343 is extended from an input of the low noise amplifier 333. As mentioned above, by arranging the extending portion 343 extended from the input of the low noise amplifier 333 so as to face the extending portion 341 extended from the output of the low noise amplifier 331 and the extending portion 342 extended from the output of the low noise amplifier 332 with predetermined intervals, the outputs of the low noise amplifiers 331 and 332 and the input of the low noise amplifier 333 are electrically coupled.

When the mounting parts such as low noise amplifiers 331, 332, and 333 and the like are installed, for example, a cream solder is filled into each part pad on the strip conductors, thereby installing the mounting parts. By heating the cream solder through heating means such as a reflow furnace or the like in this state, the soldering is performed.

As mentioned above, according to the embodiment, the signals of two systems comprising the reception signal of the horizontally polarized wave of one satellite from the current feeding device 311 and the reception signal of the horizontally polarized wave of the other satellite from the current feeding device 313 are coupled and the signals of two systems comprising the reception signal of the vertically polarized wave of one satellite from the current feeding device 312 and the reception signal of the vertically polarized wave of the other satellite from the current feeding device 314 are coupled by the coupling circuit 302. Therefore, the six low noise amplifiers 221, 222, 223, 224, 241, and 242 (refer to FIG. 6) needed in the conventional low noise frequency converting apparatus are reduced to the three low noise amplifiers 331, 332, and 333 and the miniaturization and the reduction of costs are realized. Since the number of low noise amplifiers is reduced, the construction, connecting lines, and the like of the control unit 310 for the low noise amplifiers are simplified.

Although the second embodiment has been described above with respect to the case of receiving the radio waves from two satellites of a band of, for example, 12 GHz transmitted from two satellites existing on the geostationary satellite orbit, the invention can be also similarly applied to the case of receiving radio waves from three or more satellites.

Although each satellite transmits the radio wave of the horizontally polarized wave and the radio wave of the vertically polarized wave in the second embodiment, the invention can be also similarly applied to the case of transmitting a radio wave of a circularly polarized wave of the right turn and a radio wave of a circularly polarized wave of the left turn from each satellite.

That is, although both two satellites transmit the radio wave of the horizontally polarized wave and the radio wave of the vertically polarized wave in the foregoing example, the invention can be also applied to the case where one satellite transmits a radio wave of a horizontally polarized wave and a radio wave of a vertically polarized wave and the other satellite transmits a radio wave of a circularly polarized wave of the right turn and a radio wave of a circularly polarized wave of the left turn. The invention can also cope with a case where both two satellites transmit a radio wave of a circularly polarized wave of the right turn and a radio wave of a circularly polarized wave of the left turn. The invention can also cope with a case where one satellite transmits a radio wave of a horizontally polarized wave and a radio wave of a vertically polarized wave and the other satellite transmits a radio wave of a circularly polarized wave of the right turn and a radio wave of a circularly polarized wave of the left turn.

The invention can also cope with the case where one satellite transmits a radio wave of one polarized wave and the other satellite transmits radio waves of two polarized waves. For example, the invention can also cope with the case of receiving radio wave from a satellite which broadcasts only a radio wave of a circularly polarized wave of the right or left turn and radio waves from a satellite which transmits a radio wave of a horizontally polarized wave and a radio wave of a vertically polarized wave. The invention can also cope with the case of receiving a radio wave from a satellite which broadcasts only a radio wave of a circularly polarized wave of the right or left turn and radio waves from a satellite which transmits a radio wave of a circularly polarized wave of the right turn and a radio wave of a circularly polarized wave of the left turn. The invention can also cope with the case of receiving a radio wave from a satellite which broadcasts only a radio wave of a horizontally or vertically polarized wave and radio waves from a satellite which transmits a radio wave of a horizontally polarized wave and a radio wave of a vertically polarized wave. The invention can also cope with the case of receiving a radio wave from a satellite which broadcasts only a radio wave of a horizontally or vertically polarized wave and radio waves from a satellite which transmits a radio wave of a circularly polarized wave of the right turn and a radio wave of a circularly polarized wave of the left turn.

Each of the low noise amplifiers 331, 332, and 333 and the high frequency amplifier 308 does not need to be always constructed by one active device but they can be realized as an integrated circuit. It is not always necessary to provide the high frequency amplifier 308. Further, the invention is not limited to the presence or absence of the filter circuit 305, the inserting position thereof, and the number of filter circuits. It is not always necessary to limit the local oscillator 307 to a single construction but a local oscillating circuit comprising a plurality of oscillators can be used.

Figure 8:
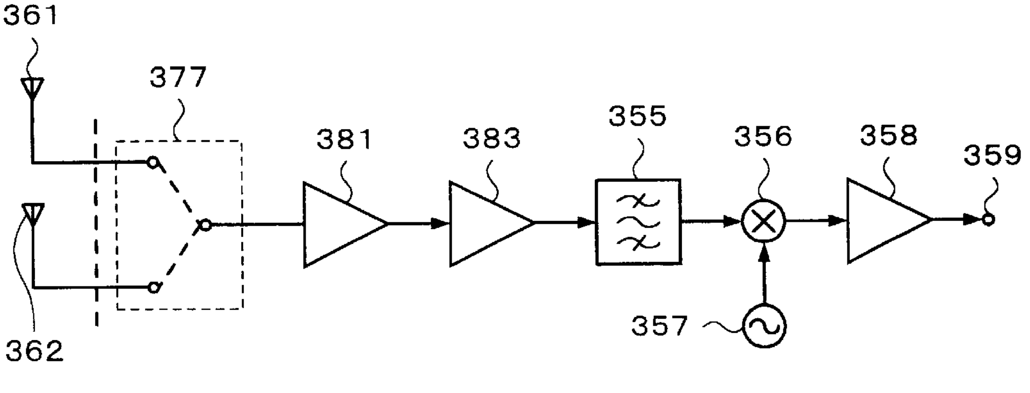
FIG. 8 is a block diagram showing a construction of the third embodiment of the invention.

FIG. 8 shows a construction of the third embodiment of the invention. Although each satellite transmits the signals of two polarized waves which cross perpendicularly each other in the second embodiment, the third embodiment shows an example in the case where each satellite transmits a signal of one polarized wave. Each satellite transmits the signal of one of a horizontally polarized wave, a vertically polarized wave, a circularly polarized wave of the right turn, a circularly polarized wave of the left turn, and the like.

In FIG. 8, reference numeral 361 denotes a current feeding device for a reception signal from one satellite and 362 denotes a current feeding device for a reception signal from the other satellite. Radio waves are transmitted from two satellites existing at close positions on a geostationary satellite orbit by using a band of, for example, 12 GHz. The radio waves from two satellites are received by one parabolic antenna.

Between the reception outputs, the signal from one satellite is inputted to the current feeding device 361 and the reception signal of one satellite is obtained from the current feeding device 361. The signal from the other satellite is inputted to the current feeding device 362 and the reception signal of the other satellite is obtained from the current feeding device 362.

The reception signal of one satellite from the current feeding device 361 and the reception signal of the other satellite from the current feeding device 362 are supplied to a low noise amplifier 381 through a coupling circuit 377. An output of the low noise amplifier 381 is supplied to a low noise amplifier 383 and further amplified.

An output of the low noise amplifier 383 is supplied to a filter circuit 355. Unnecessary band components in the reception signal are removed by the filter circuit 355. An output of the filter circuit 355 is supplied to a mixer 356.

A local oscillating signal from a local oscillator 357 is supplied to the mixer 356. In the mixer 356, the reception signal of a band of, for example, 12 GHz is converted to an intermediate frequency signal of a band of, for example, 1 GHz. An output of the mixer 356 is extracted from an output terminal 359 through a high frequency amplifier 358. A signal from the output terminal 359 is supplied to the indoor receiver through a connecting cable.

According to the embodiment of the invention, the signals of two systems comprising the reception signal of one satellite from the current feeding device 361 and the reception signal of the other satellite from the current feeding device 362 are supplied to the low noise amplifier 381. If a frequency of the signal from one satellite and a frequency of the signal from the other satellite differ, the signals of two systems can be selected later on the receiver side. Therefore, the amplifier at the first stage for the reception signal of the horizontally polarized wave of one satellite and the amplifier at the first stage for the reception signal of the horizontally polarized wave of the other satellite can be used in common by the low noise amplifier 381.

Figure 9:
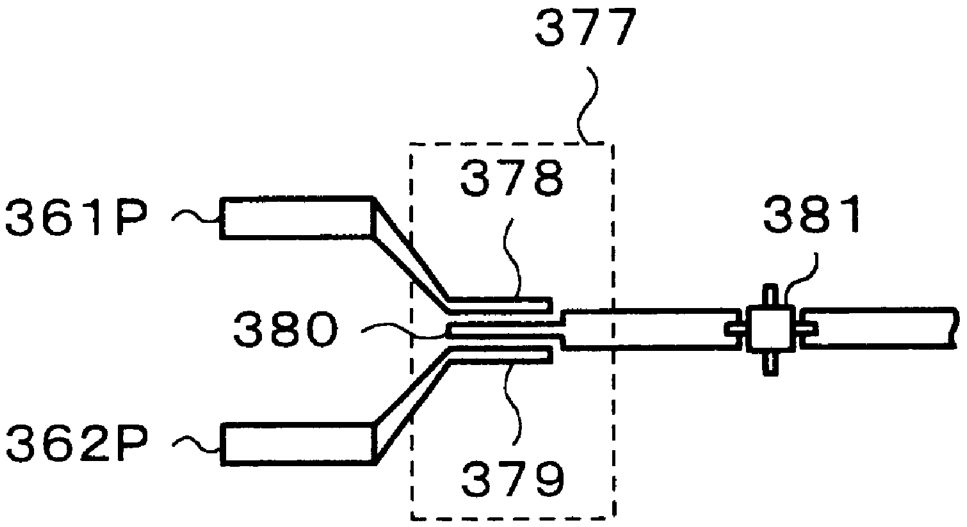
FIG. 9 is a schematic diagram showing a to layout on a circuit board of a main portion of the third embodiment of the invention.

FIG. 9 shows an example of a specific layout on a circuit board of the coupling circuit 377 and low noise amplifier 381 provided as an input section of the foregoing third embodiment.

In FIG. 8, reference numerals 361P and 362P denote probes for receiving the signal of one satellite and the signal of the other satellite. The probes correspond to the current feeding devices 361 and 362, respectively.

As shown in FIG. 9, the coupling circuit 377 is constructed by extending portions 378, 379, and 380 of strip conductors each having a length of almost $\lambda/4$ ($\lambda$ denotes a wavelength at a center frequency of a reception band). The extending portion 378 is extended from the probe 361P to receive the signal from one satellite and the extending portion 379 is extended from the probe 362P to receive the signal from the other satellite. The extending portion 380 is extended from an input of the low noise amplifier 381. As mentioned above, by arranging the extending portion 380 extended from the input of the low noise amplifier 381 so as to face the extending portion 378 extended from the probe 361P and the extending portion 379 extended from the probe 362P with predetermined intervals, the outputs of the probes 361P and 362P and the input of the low noise amplifier 381 are electrically coupled.

According to the third embodiment constructed as mentioned above, the signal from the current feeding device 361 and the signal from the current feeding device 362 are synthesized through the coupling circuit 377, the synthesized output is supplied to the low noise amplifier 381, and the first-stage low noise amplifiers for two satellites are used in common by the low noise amplifier 381. There is no need to provide a control unit, connecting lines, and the like for the low noise amplifier. Thus, the number of low noise amplifiers is reduced and the miniaturization and the reduction of costs are realized.

According to the invention, a plurality of coupling circuits needed in the conventional low noise converter are constructed by one coupling circuit. The low noise amplifiers at the second stage are used in common by one low noise amplifier. According to the invention, therefore, it can cope with three or more different radio wave signals and the miniaturization and the reduction of costs are realized.

Further, according to the invention, for example, in the case where the signals from two satellites are received by one antenna, by synthesizing the signals of different frequencies between the radio waves of two satellites and supplying the synthesized signal to the first-stage low noise amplifier, the first-stage low noise amplifier is used in common. Thus, the number of low noise amplifiers needed in the conventional low noise frequency converting apparatus is reduced and the miniaturization and the reduction of costs are realized.

The present invention is not limited to the foregoing embodiments but many modifications and variations are possible within the spirit and scope of the appended claims of the invention.

What is claimed is:

1. A low noise converting apparatus comprising:

a plurality of first-stage low noise amplifying means each provided in a path of a respective reception signal of a polarized wave received from a plurality of satellites;

control means for selectively making one of said plurality of first-stage low noise amplifying means operative in accordance with a satellite selected from said plurality of satellites and the polarized wave of a radio wave therefrom;

a single next-stage low noise amplifying means for further amplifying an output of a selected one of said plurality of first-stage low noise amplifying means;

coupling means for coupling said plurality of first-stage low noise amplifying means and said single next-stage low noise amplifying means; and frequency converting means for frequency converting an output of said single next-stage low noise amplifying means and producing a converted output signal, wherein said coupling means includes extending portions extended in strip conductor shapes from outputs of said plurality of first-stage low noise amplifying means and an extending element extended in a strip conductor shape from an input of said single next-stage low noise amplifying means, said extending portions and said extending element being arranged so as to closely face each other.

2. The apparatus according to claim 1, wherein said plurality of satellites include at least a first satellite for transmitting a radio wave of one polarized wave and a second satellite for transmitting radio waves of two polarized waves having a mutually orthogonal relation.

3. The apparatus according to claim 2, wherein said two polarized waves having the mutually orthogonal relation are a horizontally polarized wave and a vertically polarized wave.

4. The apparatus according to claim 2, wherein said two polarized waves having the mutually orthogonal relation are a right-hand circularly polarized wave and a left-hand circularly polarized wave.

5. The apparatus according to claim 1, wherein said plurality of satellites include at least two satellites for transmitting two polarized waves having a mutually orthogonal relation.

6. The apparatus according to claim 5, wherein said two polarized waves having a mutually orthogonal relation transmitted by said two satellites are a horizontally polarized wave and a vertically polarized wave.

7. The apparatus according to claim 5, wherein said two polarized waves having a mutually orthogonal relation transmitted by said two satellites are a right-hand circularly polarized wave and a left-hand circularly polarized wave.

8. The apparatus according to claim 5, wherein said two polarized waves having mutually orthogonal relation in one of said two satellites are a horizontally polarized wave and a vertically polarized wave and said two polarized waves having a mutually orthogonal relation in another one of said two satellites are a right-hand circularly polarized wave and a left-hand circularly polarized wave.

9. A broadcasting receiving antenna having a low noise converting apparatus comprising:

a plurality of first-stage low noise amplifying means each provided in a path of a reception signal of a polarized wave of each of a plurality of satellites;

control means for selectively making one of said plurality of first-stage low noise amplifying means operative in accordance with a selected satellite of said plurality of satellite and the corresponding polarized wave;

a single next-stage low noise amplifying means for further amplifying an output of these selected one of said plurality of first-stage low noise amplifying means;

coupling means for coupling said plurality of first-stage low noise amplifying means and said single next-stage low noise amplifying means; and frequency converting means for frequency converting an output of said single next-stage low noise amplifying means, wherein said coupling means includes extending portions extended in strip conductor shapes from outputs of said plurality of first-stage low noise amplifying means and an extending element extended in a strip conductor shape from an input of said single next-stage low noise amplifying means, said extending portions and said extending element being arranged so as to closely face each other.

10. A low noise converting apparatus comprising:

coupling means for synthesizing radio waves of different frequencies received from a plurality of satellites and outputting a synthesized radio wave;

first-stage low noise amplifying means for amplifying a reception signal of said plurality of satellites synthesized by said coupling means;

next-stage low noise amplifying means for further amplifying an output of said first-stage low noise amplifying means; and frequency converting means for frequency converting an output of said next-stage low noise amplifying means, wherein said coupling means comprises a coupling portion including extending portions extended in strip conductor shapes from receiving terminals for reception signals from said plurality of satellites and an extending element extended in a strip conductor shape from an input of said first-stage low noise amplifying means, said extending portions and said extending element being arranged so as to closely face each other.

11. The apparatus according to claim 10, wherein said coupling means synthesizes the radio waves of different frequencies and a polarized wave among the radio waves of said plurality of satellites and outputs a synthesized radio wave.

12. The apparatus according to claim 10, wherein said plurality of satellites include at least a first satellite for transmitting a radio wave of one polarized wave and a second satellite for transmitting radio waves of two polarized waves having a mutually orthogonal relation.

13. The apparatus according to claim 10, wherein said plurality of satellites include at least two satellites for transmitting two polarized waves having a mutually orthogonal relation.

14. The apparatus according to claim 13, wherein said two polarized waves having mutually orthogonal relation in both said two satellites are a horizontally polarized wave and a vertically polarized wave.

15. The apparatus according to claim 13, wherein said two polarized waves having mutually orthogonal relation in both said two satellites are a right-hand circularly polarized wave and a left-hand circularly polarized wave.

16. The apparatus according to claim 13, wherein said two polarized waves having mutually orthogonal relation in one of said two satellites are a horizontally polarized wave and a vertically polarized wave and said two polarized waves having mutually orthogonal relation in another one of said two satellites are a right-hand circularly polarized wave and a left-hand circularly polarized wave.

17. A low noise converting apparatus coupling means for synthesizing radio waves of different frequencies received from a plurality of satellites and outputting a synthesized radio wave;

first-stage low noise amplifying means for amplifying a reception signal of said plurality of satellites synthesized by said coupling means;

next-stage low noise amplifying means for further amplifying an output of said first-stage low noise amplifying means; and frequency converting means for frequency converting an output of said next-stage low noise amplifying means, wherein said coupling means synthesizes the radio waves of different frequencies and a polarized wave among the radio waves of said plurality of satellites and outputs a synthesized radio wave, and wherein said coupling means comprises a coupling portion including extending portions extended in strip conductor shapes from receiving terminals for reception signals of a same polarized wave among the reception signals from said plurality of satellites and an extending element extended in a strip conductor shape from an input of said first-stage low noise amplifying means, said extending portions and said extending element being arranged so as to closely face each other in correspondence to said polarized wave.

18. A broadcasting receiving antenna having a low noise converting apparatus comprising:

coupling means for synthesizing radio waves of different frequencies from among radio waves received from a plurality of satellites and outputting a synthesized radio wave;

first-stage low noise amplifying means for amplifying the synthesized radio wave synthesized by said coupling means;

next-stage low noise amplifying means for further amplifying an output of said first-stage low noise amplifying means; and frequency converting means for frequency converting an output of said next-stage low noise amplifying means and producing a converted output signal, wherein said coupling means comprises a coupling portion including extending portions extended in strip conductor shapes from receiving terminals for reception signals from said plurality of satellites and an extending element extended in a strip conductor shape from an input of said first-stage low noise amplifying means, said extending portions and said extending element being arranged so as to closely face each other.

* * * * *